US007160407B2

(12) United States Patent
Weiler

(10) Patent No.: US 7,160,407 B2
(45) Date of Patent: Jan. 9, 2007

(54) METHODS AND APPARATUS FOR REPLACING A TONER CARTRIDGE SHUTTER

(75) Inventor: Allan P. Weiler, Sanford, NC (US)

(73) Assignee: Static Control Components, Inc., Sanford, NC (US)

( * ) Notice: Subject to any disclaimer, the term of this patent is extended or adjusted under 35 U.S.C. 154(b) by 340 days.

(21) Appl. No.: 10/792,977

(22) Filed: Mar. 4, 2004

(65) Prior Publication Data

US 2005/0196578 A1 Sep. 8, 2005

(51) Int. Cl.
*B29C 73/00* (2006.01)

(52) U.S. Cl. .......................... 156/94; 156/98; 399/106; 399/109; 399/114

(58) Field of Classification Search .................. 156/94, 156/98, 187; 399/106, 109, 114
See application file for complete search history.

(56) References Cited

U.S. PATENT DOCUMENTS 5,231,453 A * 7/1993 Nakai et al. ................ 399/114
5,398,638 A * 3/1995 Bonk ......................... 116/173

* cited by examiner

*Primary Examiner*—Jeff H. Aftergut
*Assistant Examiner*—John L. Goff

(57) ABSTRACT

Techniques are provided for repairing or remanufacturing a toner cartridge which includes a drum shutter and a toner cartridge body. The drum shutter includes a flexible covering portion attached to both an arm element and the toner cartridge body. The flexible covering portion is removed from the arm element and the toner cartridge. A replacement flexible covering portion is secured to the arm element. The replacement flexible covering portion is attached to the toner cartridge body.

6 Claims, 4 Drawing Sheets

METHODS AND APPARATUS FOR REPLACING A TONER CARTRIDGE SHUTTER

BACKGROUND

The present invention relates generally to remanufacturing toner cartridges, and more particularly to techniques for replacing a toner cartridge shutter during the remanufacturing process.

In the electrophotographic industry, there is a growing market for the remanufacture and refurbishing of various types of printing or copying components such as toner cartridges, ink cartridges, magnetic rollers, seals, and the like. Toner cartridges, once spent, are unusable for their originally intended purpose. Without a refurbishing process, they would simply be discarded, even though the cartridge itself may still have potential life. As a result, techniques have been developed specifically to address this issue. These processes may entail, for example, the disassembly of the various structures of the cartridge, replacing toner, cleaning, adjusting or replacing any worn components and reassembling the cartridge.

Toner cartridges for use in electrophotographic imaging apparatus typically include an optical photoconductor (OPC) drum as part of the cartridge. The OPC drum is commonly hidden behind a moveable shutter designed to protect the OPC drum from being exposed to light or contacted by a user when the cartridge is not installed in an imaging device. Interaction between the drum shutter and mating features in the imaging device causes the shutter to automatically retract as the cartridge is installed in the imaging device. The presence and operation of the drum shutter are important to the proper function of the toner cartridge.

On some toner cartridges, such as the HP3500 and HP3700 toner cartridges, the drum shutter includes a thin, flexible polymer film supported by a rigid steel arm. Due to the fragile nature of this polymer film, damage, and the resulting loss of proper function, are likely to occur during post-use handling, shipping and storage. A recharger, or remanufacturer, of toner cartridges receiving such a damaged toner cartridge must choose between replacing the drum shutter film or scrapping the entire cartridge. It is therefore desireable to provide a replacement for the original equipment manufacturer (OEM) drum shutter film.

SUMMARY

In accordance with an embodiment of the present invention, techniques are provided for repairing or remanufacturing a toner cartridge which includes a drum shutter and a toner cartridge body. The drum shutter includes a flexible covering portion attached to both an arm element and the toner cartridge body. The flexible covering portion is removed from the arm element and toner cartridge. A replacement flexible covering portion is secured to the arm element. The replacement flexible covering portion is attached to the toner cartridge body.

A more complete understanding of the present invention, as well as further features and advantages of the invention, will be apparent from the following detailed description and the accompanying drawings.

DETAILED DESCRIPTION

The following detailed description of preferred embodiments refers to the accompanying drawings which illustrate specific embodiments of the invention. In the discussion that follows, specific techniques for replacing drum shutters on HP3500 toner printer cartridges and HP3700 toner printer cartridges are disclosed. Other embodiments having different structures and operations for the shutter replacement of other types of cartridges for use with other electrophotographic devices do not depart from the scope of the present invention.

Figure 1:
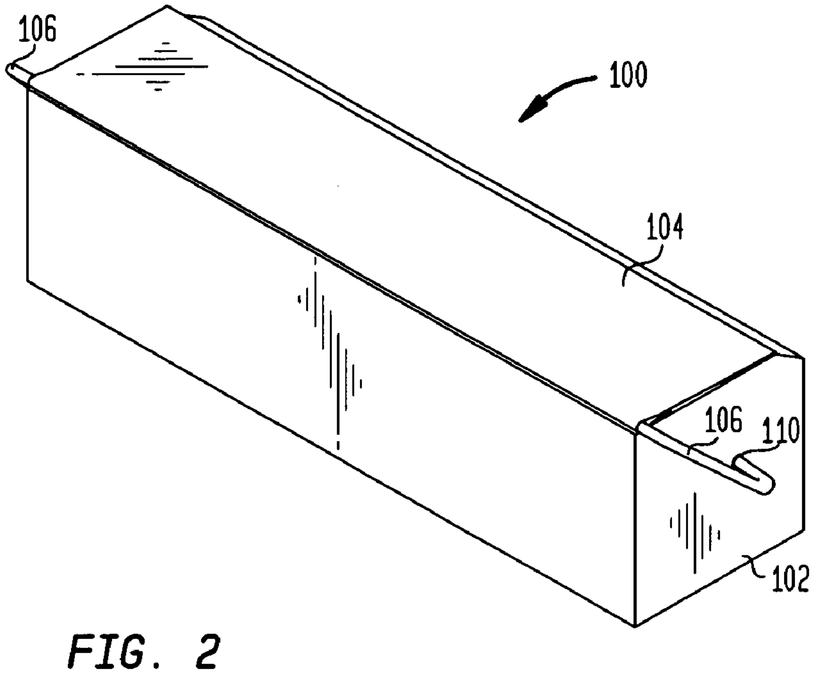
FIG. 1 shows a perspective view of an end portion of a toner cartridge with a closed shutter.
Figure 2:
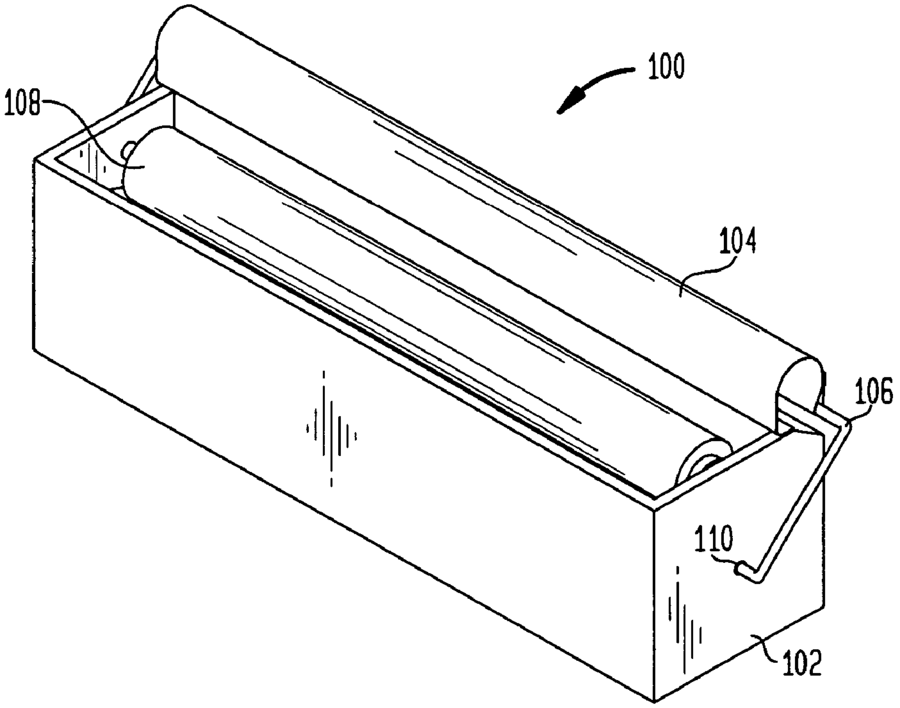
FIG. 2 shows a perspective view of an end portion of a toner cartridge with an open shutter.

FIG. 1 shows a simplified view of an end portion 100 of a prior art toner cartridge with a closed shutter. The shutter film 104 is held in place by a rigid arm 106. The rigid arm 106 includes two ends residing in recesses 110 on each end of toner cartridge body 102. As seen in FIG. 2, when the toner cartridge is installed in an imaging device, the arm 106 rotates in the recesses 110 and the shutter film 104 is pulled back, exposing optical photoconductor (OPC) drum 108.

Figure 3:
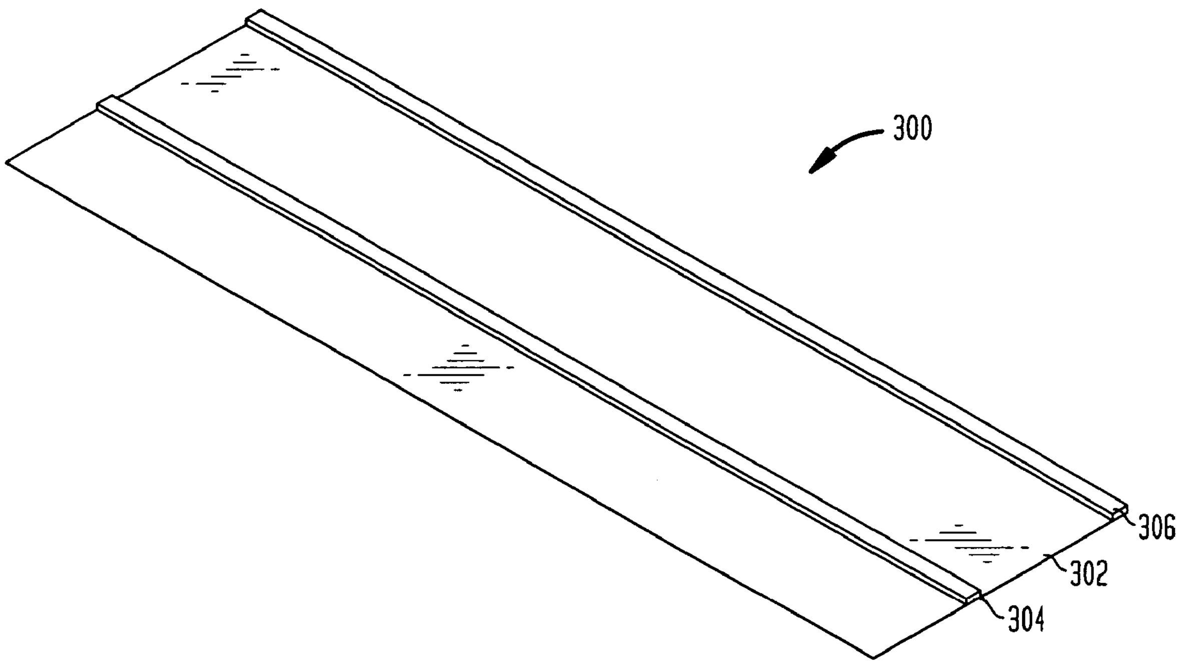
FIG. 3 shows a replacement shutter for a toner cartridge in accordance with the present invention.
Figure 4:
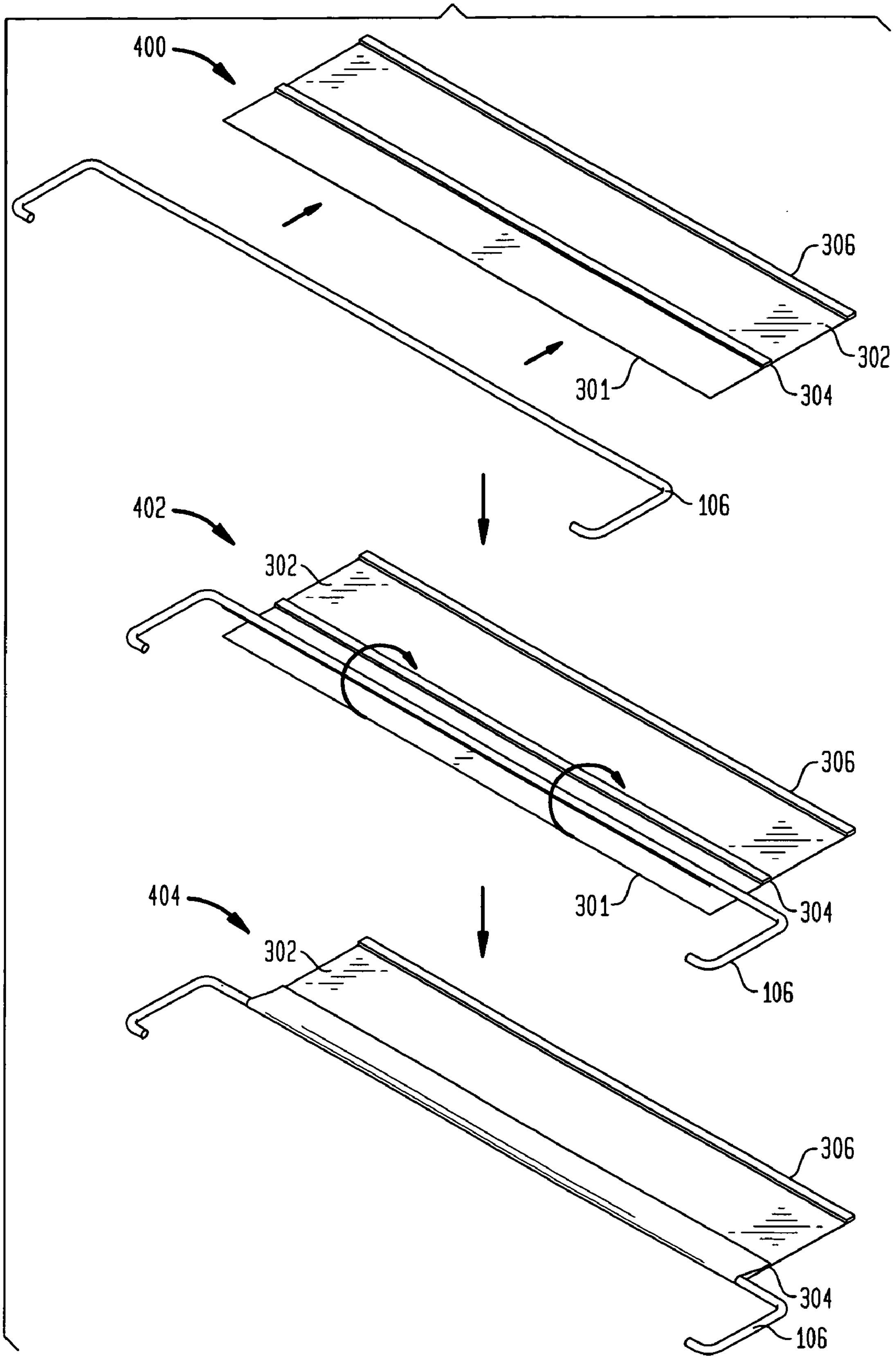
FIG. 4 illustrates a series of views showing the attachment of a replacement shutter film to a wire arm in accordance with the present invention.
Figure 5:
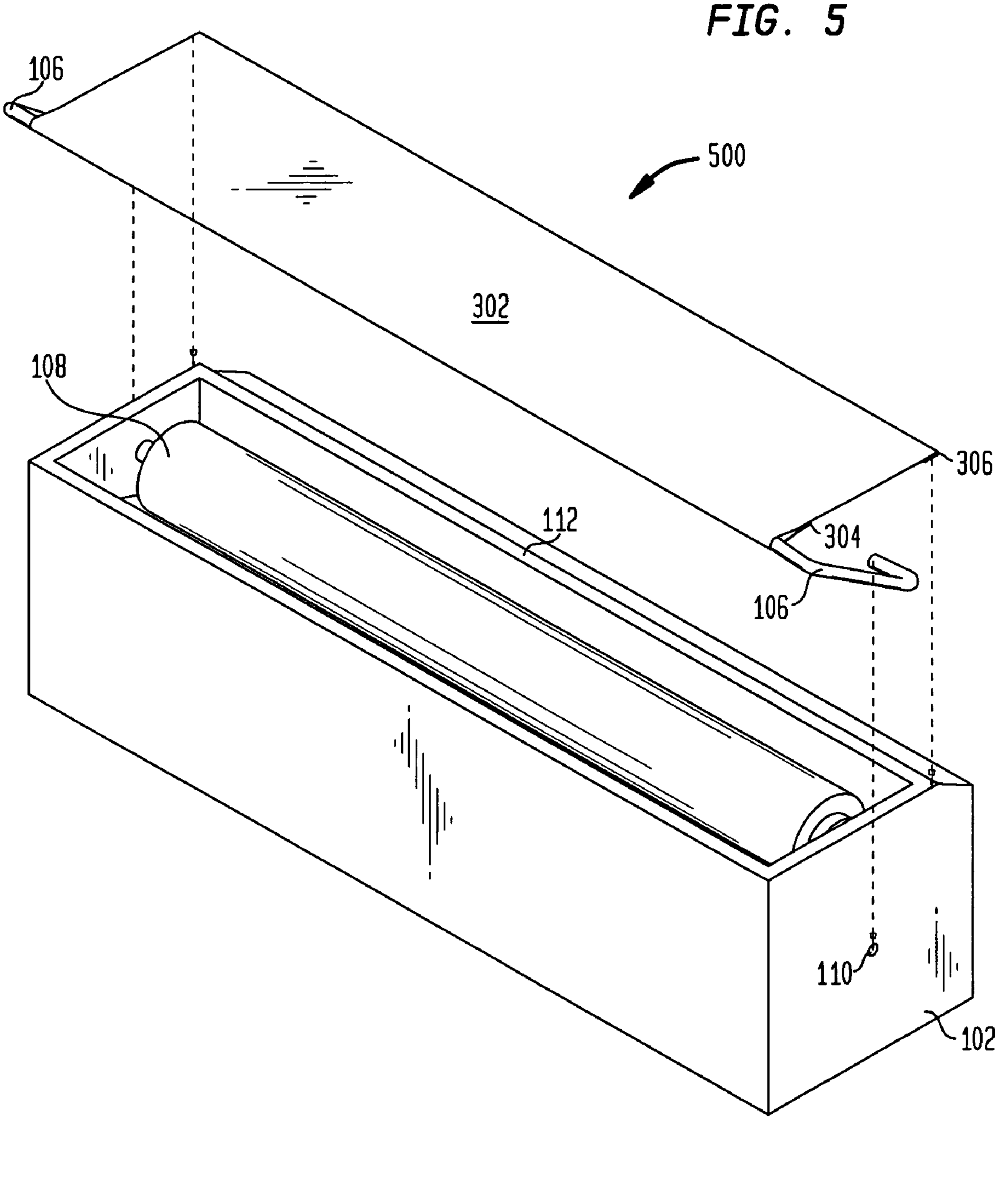
FIG. 5 shows an exploded perspective view of a remanufactured toner cartridge in accordance with the present invention.

FIG. 3 shows a replacement shutter 300 for a toner cartridge in accordance with the present invention. The shutter 300 comprises adhesive elements 304 and 306 attached to a sheet 302. In a preferred embodiment, the adhesive elements 304 and 306 are each 0.0125" wide acrylic pressure sensitive adhesive strips, such as Avery 8302, with a release paper covering each adhesive element 304 and 306. Adhesive element 304 functions to secure one edge of the sheet 302 in place around the arm 106 as seen in FIGS. 4 and 5, while adhesive element 306, located along an opposing edge of the sheet 320, functions to secure the sheet 302 to the toner cartridge body 102. In a preferred embodiment for use with an HP3500 or HP3700 toner cartridge, the sheet 302 may suitably comprise a 0.004" thick flexible material, such as polyethylene, having dimensions of 11.125" and 2.25". While in a preferred embodiment the adhesive elements 304 and 306 are mounted on a common side of the sheet 302 as shown in FIG. 3, in an alternative embodiment these adhesive elements may be mounted on opposite sides of the sheet 302.

Before installing the replacement shutter 300, the existing shutter film 104 must be removed. The shutter film 104 may be peeled or scraped off the toner cartridge 102 and cut from the arm 104. FIG. 4 illustrates a series of views 400, 402 and 404 showing the attachment of the replacement shutter 300 to the arm 106 in accordance with the present invention. As seen in views 400 and 402, the arm 106 may be suitably placed on the sheet 302 between the adhesive element 304 and an edge 301 of the sheet 302. With the release paper removed from the adhesive element 304, the edge 301 is folded over the arm 106 to adhere a portion of the sheet 302 adjacent to the edge 301 to the adhesive element 304, as shown in views 402 and 404. The replacement sheet 302 is thus secured around the arm 106. Next, as shown in FIG. 5, the release paper is removed from adhesive element 306 and adhesive element is attached to the toner cartridge body along edge 112, and the ends of the rigid arm 106 are inserted into the recesses 110.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of repairing a toner cartridge comprising a drum shutter and a toner cartridge body, the drum shutter comprising a flexible covering portion attached to both an arm element and the toner cartridge body, the method comprising:

providing a replacement flexible covering portion;

securing the replacement flexible covering portion to the arm element; and attaching the replacement flexible covering portion to the toner cartridge body, wherein the replacement flexible covering portion comprises a sheet, wherein the replacement covering portion comprises a first adhesive element, said securing the replacement flexible covering portion to the arm element further comprising:

wrapping a portion of one end of the sheet around the arm portion; and securing the wrapped portion utilizing the first adhesive element, wherein the replacement covering portion comprises a second adhesive element, said attaching the replacement flexible covering portion to the toner body further comprising:

securing the replacement flexible covering portion to the toner cartridge body utilizing the second adhesive element.

2. The method of claim 1 wherein first and second adhesive elements each comprise at least one adhesive strip.

3. The method of claim 2 wherein the sheet comprises a polyethylene material.

4. The method of claim 1 further comprising, before securing the replacement flexible covering portion to the arm element:

disengaging the arm element from engagement with the toner cartridge body.

5. The method of claim 4 further comprising, after securing the replacement flexible covering portion to the arm element:

reengaging the arm element with the toner cartridge body.

6. The method of claim 1 further comprising:

removing the flexible covering portion from the arm element and toner cartridge.

* * * * *